(12) United States Patent
Cain et al.

(10) Patent No.: US 6,773,733 B2
(45) Date of Patent: Aug. 10, 2004

(54) STRUCTURED PARTICULATE SYSTEMS

(75) Inventors: Frederick William Cain, Wormerveer (NL); Gerald Patrick McNeill, Channahon, IL (US); Tom Tongue, Channahon, IL (US)

(73) Assignee: Loders Croklaan USA LLC, Channahon, IL (US)

( * ) Notice: Subject to any disclaimer, the term of this patent is extended or adjusted under 35 U.S.C. 154(b) by 0 days.

(21) Appl. No.: 09/816,864

(22) Filed: Mar. 26, 2001

(65) Prior Publication Data

US 2002/0192353 A1 Dec. 19, 2002

(51) Int. Cl.$^7$ .............. A23L 1/302; A23L 1/30; A23P 1/02
(52) U.S. Cl. .......... 426/72; 426/285; 426/565; 426/580; 426/603; 426/653
(58) Field of Search .............. 426/89, 302, 303, 426/549, 565, 580, 72, 285, 603, 653

(56) References Cited

U.S. PATENT DOCUMENTS

| | | | |
|---|---|---|---|
| 2,851,359 A | | 9/1958 | Diller .............. 99/78 |
| 3,623,889 A | | 11/1971 | Falconer et al. .............. 99/134 |
| 3,881,005 A | | 4/1975 | Thakkar et al. .............. 424/238 |
| 3,957,964 A | * | 5/1976 | Grimm, III .............. 424/10.4 |
| 4,071,615 A | * | 1/1978 | Barth .............. 424/52 |
| 4,102,806 A | * | 7/1978 | Kondo et al. .............. 264/4.4 |
| 4,160,850 A | * | 7/1979 | Hallstrom et al. .............. 426/601 |
| 4,170,635 A | * | 10/1979 | Barth .............. 424/49 |
| 4,513,016 A | * | 4/1985 | Blake et al. .............. 426/554 |
| 4,565,708 A | * | 1/1986 | Blake et al. .............. 426/579 |
| 4,698,264 A | * | 10/1987 | Steinke .............. 264/4.4 |
| 4,804,548 A | * | 2/1989 | Sharma et al. .............. 426/285 |
| 4,828,857 A | * | 5/1989 | Sharma et al. .............. 426/285 |
| 4,868,180 A | | 9/1989 | Izuhara et al. .............. 514/251 |
| 4,978,537 A | | 12/1990 | Song .............. 426/5 |
| 5,139,794 A | | 8/1992 | Patel et al. .............. 426/5 |
| 5,206,049 A | | 4/1993 | Fielding et al. .............. 426/649 |
| 5,418,010 A | * | 5/1995 | Janda et al. .............. 264/4.1 |
| 5,441,753 A | | 8/1995 | McGinley et al. .............. 426/96 |
| 5,576,042 A | * | 11/1996 | Fuisz .............. 426/548 |
| 5,587,172 A | * | 12/1996 | Cherukuri et al. .............. 424/401 |
| 5,698,246 A | * | 12/1997 | Villamar .............. 426/2 |
| 5,714,168 A | | 2/1998 | Stroh et al. .............. 424/490 |
| 5,853,788 A | * | 12/1998 | Murphy et al. .............. 426/595 |
| 5,866,641 A | * | 2/1999 | Ronden et al. .............. 521/54 |
| 5,876,506 A | | 3/1999 | Cherukuri et al. .............. 127/63 |
| 5,922,392 A | * | 7/1999 | Kelly et al. .............. 426/516 |
| 6,030,645 A | | 2/2000 | Tritsch et al. .............. 424/490 |
| 6,129,944 A | | 10/2000 | Tiainen et al. .............. 426/577 |
| 6,436,453 B1 | | 8/2002 | van Lengerich et al. .............. 426/74 |
| 2002/0146487 A1 | | 10/2002 | Tsukuda et al. .............. 426/89 |
| 2002/0172746 A1 | * | 11/2002 | Cain et al. .............. 426/551 |
| 2003/0152629 A1 | * | 8/2003 | Shefer et al. .............. 424/484 |

FOREIGN PATENT DOCUMENTS

| | | |
|---|---|---|
| EP | 0 075 443 | 3/1983 |
| EP | 0 398 465 | 11/1990 |
| EP | 0 555 484 | 8/1993 |
| EP | 0 589 375 A1 | 3/1994 |
| EP | 0 689 834 A2 | 1/1996 |
| EP | 0 689 834 | 1/1996 |
| EP | 1 046 396 | 10/2000 |
| EP | 1 064 856 A2 | 1/2001 |
| EP | 1 064 856 | 1/2001 |
| FR | 2 791 906 | 10/2000 |
| WO | WO 98/58554 | 12/1998 |
| WO | WO 99/48372 | 9/1999 |
| WO | WO99/48372 | 9/1999 |
| WO | WO 99/65336 | 12/1999 |
| WO | WO 01/19383 | 3/2001 |
| WO | WO 02/17892 | 3/2002 |

OTHER PUBLICATIONS

Sax, N. I. 1987. Hawley's Condensed Chemical Dictionary. 11$^{th}$ edition. Van Nostrand Reinhold Co., New York, p. 747, 1029.*

Perry, R. H. 1984. Perry's Chemical Engineers' Handbook, 6$^{th}$ edition. McGraw–Hill, Inc. p. 21–13 to 21–15.*

Prescott et al, Pharmaceutical Technology (Oct. 2000) pp. 60–84.

Search Report EP 02075767.

* cited by examiner

Primary Examiner—Carolyn Paden
(74) Attorney, Agent, or Firm—Morgan, Lewis & Bockius LLP

(57) ABSTRACT

Structured particulate systems of active solid organic components in a matrix in a weight ratio of 99:1 to 1:99 and a mean weight diameter of 25 to 500 microns wherein the active organic component is selected from the group consisting of oleanoic acid, ursolic acid, folic acid, policosanol, phytosterols, or derivatives or salts thereof are novel and can be used to improve the oral properties and/or the homogeneity of the organic, solid, active component in a food product.

17 Claims, No Drawings

STRUCTURED PARTICULATE SYSTEMS

BACKGROUND OF THE INVENTION

(1) Field of the Invention

The invention relates to a structured particulate system which is particularly useful for incorporating solid organic components into foods.

(2) Description of Related Art

The use of solid organic active components in foods and in particular in health foods is well known nowadays. Examples of active organic components that are applied herefore are e.g. folic acid, ursolic acid, phytosterols, oleanolic acid and policosanol or derivatives or salts thereof. These components are added to the food as small particles (e.g. with a size of 2 to 250 microns) or as a solution after being dissolved in a solvent. Neither of these delivery forms have been found to be satisfactory because the addition as small particles led to problems with oral mouthfeel and to problems with the bioavailability of the components, while also the homogeneity of the food product was poor due to a limited dispersability of the components in the food products. Delivery in the form of a solution in a solvent also led to problems with mouthfeel and bioavailabilty. Moreover this delivery form introduced a solvent in the food product that had to be food grade and which is not always easily available for the type of component that needs to be introduced, while the solvent also easily could affect the texture of the food product in a negative sense. Further the presence of a solvent diluted the amount of active component in the food product.

BRIEF SUMMARY OF THE INVENTION

We studied whether we could find a solution for above problems and this study resulted in the finding of a new delivery form for the solid organic active components.

Therefore our invention concerns in the first instance novel structured particulate systems comprising active, organic, solid component(s) in a matrix in a weight ratio of 1:99 to 99:1, preferably 5:95 to 95:5, more preferably 15:85 to 85:15 and wherein the active, organic, solid component(s) preferably is selected from one or more of the components from the group consisting of oleanoic acid, ursolic acid, folic acid, policosanol, phytosterols, or derivatives or salts thereof and wherein the mean weight diameter of the particles of the structured particulate system ranges from 25 to 1500 microns.

DETAILED DESCRIPTION OF THE INVENTION

The active component is incorporated completely in the matrix and the particle size of the solid active organic component in the system will be about the same as the size of these components used as starting material for the preparation of the structured particulates. The matrix forms a kind of network wherein the active solid organic components are incorporated. The particle size of the particulate system expressed as mean weight diameter is greater than the size of the individual components where it is made of, still we found that the oral properties were improved while also positive effects were noticed on bioavailability and dispersability of these systems compared with the active organic components. This was surprising.

The best performance of our novel system was observed when the system displayed a loose bulk density of 0.1 to 1.1, preferably 0.3 to 0.6 Kg/l. Loose bulk density being measured by measuring the volume of a known mass powder sample, that has passed through a screen into a gradulated cylinder. The procedure is described in USP<616<Bulk Density and Tapped Density.

The mean weight diameter of the particles of our novel partiulate system preferably ranges from 50 to 400 micron, in particular from 60 to 300 micron.

The weight ratio between the active solid organic component and the matrix can range within a broad range but we found that the best results were obtained if this ratio was from 80:20 to 20:80, in particular from 40:60 to 60:40.

The particle size of the starting active solid organic component can range from 2 to 275 micron and this results in a discrete particle size hereof within the total structured particulate system of 2 to 275, preferably 5 to 250, most preferably 7 to 200 microns.

The active solid organic component is preferably a nutritionally active component that in particular improves the oral properties of a food product, or the bioavailability of the active, organic, solid component or the dispersability of the active component in a food.

The matrix can be selected from a broad range of materials as long as they are edible. However we prefer to use a matrix selected from the group consisting of polysaccharides, modified polysaccharides, sugars, gums, thickeners, stabilisers, syrups, flours, starches, dextrose, maltodextrins and celluloses. The particle size of the particles of the matrix can vary between 1 and 350 micron, preferably between 5 and 200 micron, more preferably between 25 and 100 micron.

According to another aspect of our invention our invention also concerns with a method for improving the oral properties and/or the homogeneity of an organic, solid, active component in a food product by incorporating in the food product an effective amount, preferably 0.01 to 50 wt %, more preferably 1 to 30 wt % on food product of the structured particulate system of the invention.

Preferred food products herefore are selected from the group consisting of margarine, spreads, baked goods, extruded goods, confections, ice-creams and dairy products. The particulate system being present herein in amounts effective to achieve the desired effects. These amounts are different for the different active organic compounds and for the different food products but will range in general between 0.01 and 50 wt % on total food product. In this way the use of a normal daily amount of food product can satisfy between 10 and 100% of the recommended daily amount of the active organic component.

According to a last aspect of our invention our invention also concerns with a process for preparing the structured particulate system according to the invention wherein (i) a solid, organic active component is mixed with a matrix into a homogeneous powder (ii) a solvent, preferably water is added to part of the powder obtained to dissolve the matrix resulting in an suspension of the active component in water (iii) part of the powder resulting from step (i) is suspended in the expansion chamber of a fluid bed (iv) the suspension resulting from (ii) is sprayed onto the suspended powder of step (iii) in the expansion chamber and dried rapidly by a heating medium preferably heated air.

Experimental Part
Folic Acid, Nutritionally Active Particulate Component

Folic acid is used as the active component It has a mean weight diameter of 246 microns and a loose bulk density of 0.2 g/cc. The mean weight diameters is calculated as follows: weight fraction at screen multiplied by screen opening (microns), summed for all screen sizes.

EXAMPLE I

Procedure for Making Structured Particulate Folic Acid on a Fluid Bed

Formulas are mentioned in Table I for a Folic Acid content of respectively 25% & 50% in the structured particulate.

TABLE I

| Ingredients | Formula 25% | | Formula 50% | |
| --- | --- | --- | --- | --- |
| Product Bowl | | | | |
| 6X Powder Sugar | 50% | 30 kg | 34% | 20.4 kg |
| Folic Acid | 26.5% | 15.9 kg | 53% | 31.3 kg |
| Dextrose | 21.7% | 13.02 kg | 11.2% | 6.72 kg |
| Microcrystalline Cellulose | 0.6% | 0.36 kg | 0.6% | 0.36 kg |
| Spray Solution | | | | |
| Maltodextrin M-100 | 0.6% | 0.36 kg | 0.6% | 0.36 kg |
| Dextrose | 0.6% | 0.36 kg | 0.6% | 0.36 kg |
| Water | | 12 kg | | 12 kg |

I. Preprocessing
A. The raw ingredients are weighed as detailed in Table I.
B. The spray solution ingredients are mixed with warm water (20–40° C.) until homogeneous.

II. Process
A. 30 kg 6X Powder Sugar, 15.9 kg Folic Acid, 13.02 kg Dextrose, and 0.36 kg microcrystalline cellulose are placed in a product bowl on the fluid bed.
B. The following processing conditions are set on the control panel.

| (a). | Nozzel Height | Middle Range |
| --- | --- | --- |
| (b). | Nozzle Port | 1.8 mm |
| (c). | Inlet Air Temp | 98–100° C. |
| (d). | Outlet Air Temp | 40–42° C. |
| (e). | Spraying Air Temp | Ambient |
| (f). | Spraying Air Pressure | 3.75 bar |
| (g). | Operation Air Volume | Adjusted to best fluidization level |
| (h). | Spray Rate | 250 g/min |
| (i). | Humidification | Minimum |

C. The inlet air flap is adjusted until the operating air volume has best fluidization level.
D. The powder is fluidized until the outlet air temperature reaches 38–40° C. The spray solution spray line is connected to the fluid bed and spraying is started at a spray rate of 250 grams/minute.
E. After the spraying is completed, water is added to the tank, and spraying is continued at the same spray rate for 3 minutes.

Post Spray Processing
A. Product is dried at an outlet temperature of 48° C.
B. Sample is taken for loss on drying. Specification is 2.5% max. The fluid bed is shut down when moisture meets specification.
C. Particle size is measured on US#20, 40, 100, 200, & Pan.
D. Product is sieved on a US#20 Screen to remove oversized particulates. Oversized material is ground and added back to final product.
E. Final product is analyzed for particle size, lose on drying, loose bulk density and percent folic acid.

Note: Same Operating Procedure is used for the 50% formula.

Final Product Specifications

| | Formula 25% | Formula 50% |
| --- | --- | --- |
| % Folic Acid | 25 | 50 |
| Loss on Drying | 2.5% max. | 2.5% max. |
| Particle Size | | |
| On US#20 (840 microns) | 0.0% | 0.0% |
| On US#60 (250 microns) | 30% max. | 30% max. |
| Thru US#200 (74 microns) | 30% max. | 30% max. |

EXAMPLE II

Comparative homogeneity test of structured particulate Folic Acid with non-structured active particulate component:
1. 10 milligrams of non-structured active particulate component Folic Acid is added to 1 kg of vegetable oil and 40 milligrams of structured particulate Folic Acid (25%) to another 1 kg of vegetable oil.
2. Each sample is mixed for 5 minutes with continuous visual inspection for homogeneity.

It is demonstrated that structured particulate Folic Acid disperses readily in food products resulting in a homogeneous distribution of folic acid in the products with accurate dosing. This is in contrast to non-structured active particulate component Folic Acid which clumps together and sticks to the container walls, making it extremely difficult to deliver an accurate dose of Folic Acid to the food product.

What is claimed is:

1. A structured particulate system comprising at least one active, organic solid food additive incorporated in a matrix which forms a network completely incorporating said active, organic solid food additive in a weight ratio of 1:99 to 99:1 of said solid additive to said matrix, the mean weight diameter of the particles of said structured system ranging from 25 to 1500 microns and the system displaying a loose bulk density of 0.1 to 1.1 Kg/l, the active, organic solid additive being selected from the group consisting of oleanoic acid, ursolic acid, folic acid, policosanol and phytosterols.

2. The structured particulate system of claim 1 wherein the system displays a loose bulk density of 0.3 to 0.6 Kg/l.

3. The structured particulate system of claim 1 wherein the mean weight diameter ranges from 50 to 400 microns.

4. The structured particulate system of claim 1 wherein the mean weight diameter ranges from 60 to 300 microns.

5. The structured particulate system of claim 1 wherein the weight ratio between active additive and matrix ranges from 80:20 to 20:80.

6. The structured particulate system of claim 1 wherein the weight ratio between active additive and matrix ranges from 60:40 to 40:60.

7. The structured particulate system of claim 1 wherein the active, organic solid additive has a discrete particle size within the total structured particulate system of 2 to 275 microns.

8. The structured particulate system of claim 1 wherein the active, organic solid additive has a discrete particle size within the total structured particulate system of 5 to 250 microns.

9. The structured particulate system of claim 1 wherein the active, organic solid additive has a discrete particle size within the total structured particulate system of 7 to 200 microns.

10. The structured particulate system of claim 1 wherein the additive improves the oral properties of a food product, or the system improves the dispersability of the additive in a food.

11. The structured particulate system of claim 1 wherein the matrix is edible and is selected from the group consisting of polysaccharides, modified polysaccharides, sugars, gums, thickeners, stabilisers, syrups, flours, starches, dextrose, maltodextrins and celluloses.

12. Method for improving at least one property selected from the oral properties of a food product and the homogeneity of an organic solid active component in a food product, which comprises incorporating in the food product an effective amount of a structured particulate system comprising at least one active, organic solid food additive incorporated in a matrix which forms a network completely incorporating said active, organic solid food additive in a weight ratio of 1:99 to 99:1 of said solid additive to said matrix, the mean weight diameter of the particles of said structured system ranging from 25 to 1500 microns and the system displaying a loose bulk density of 0.1 to 1.1 Kg/l.

13. Method for improving at least one property selected from the oral properties of a food product and the homogeneity of an organic solid active component in a food product, which comprises incorporating in the food product from 0.01 to 50 wt %, based on the food product of a structured particulate system comprising at least one active, organic solid food additive incorporated in a matrix which forms a network completely incorporating said active, organic solid food additive in a weight ratio of 1:99 to 99:1 of said solid additive to said matrix, the mean weight diameter of the particles of said structured system ranging from 25 to 1500 microns and the system displaying a loose bulk density of 0.1 to 1.1 Kg/l.

14. Method for improving at least one property selected from the oral properties of a food product and the homogeneity of an organic solid active component in a food product, which comprises incorporating in the food product from 1 to 30 wt %, based on the food product of the structured particulate system of claim 1.

15. A food product selected from the group consisting of margarine, spreads, baked goods, extruded goods, confections, ice-creams and dairy products containing an effective amount of a structured particulate system comprising at least one active, organic solid food additive incorporated in a matrix which forms a network completely incorporating said active, organic solid food additive in a weight ratio of 1:99 to 99:1 of said solid additive to said matrix, the mean weight diameter of the particles of said structured system ranging from 25 to 1500 microns and the system displaying a loose bulk density of 0.1 to 1.1 Kg/l.

16. Process for preparing a structured particulate system comprising at least one active, organic solid food additive incorporated in a matrix which forms a network completely incorporating said active, organic solid food additive in a weight ratio of 1:99 to 99:1 of said solid additive to said matrix, the mean weight diameter of the particles of said structured system ranging from 25 to 1500 microns and the system displaying a loose bulk density of 0.1 to 1.1 Kg/l which comprises:

(i) mixing a solid organic active food additive with a matrix into a homogeneous powder;

(ii) adding a solvent to part of the powder obtained to dissolve the matrix resulting in a suspension of the active additive in solvent;

(iii) suspending part of the powder resulting from step (i) in an expansion chamber of a fluid bed; and (iv) spraying the suspension resulting from (ii) onto the suspended powder of step (iii) in the expansion chamber and drying rapidly by a heating medium.

17. The process of claim 16 wherein the solvent added to step (ii) is water and the heating medium of step (iv) is heated air.

* * * * *